Oct. 4, 1960 A. MACOVSKI 2,955,154

FREQUENCY CONTROL AND COLOR KILLER FOR TELEVISION RECEIVERS

Filed Feb. 1, 1957 2 Sheets-Sheet 1

INVENTOR.
ALBERT MACOVSKI
BY
ATTORNEY

INVENTOR.
ALBERT MACOVSKI
BY
ATTORNEY 2,955,154

FREQUENCY CONTROL AND COLOR KILLER FOR TELEVISION RECEIVERS

Albert Macovski, Massapequa, N.Y., assignor to Radio Corporation of America, a corporation of Delaware Filed Feb. 1, 1957, Ser. No. 637,710

10 Claims. (Cl. 178—5.4)

This invention relates to color television receivers, and more particularly to phase detector systems for comparing the received color subcarrier bursts with the output of the local color subcarrier reference oscillator to develop an automatic phase and frequency control (APFC) signal for controlling the local oscillator, a color killer control (CKC) voltage for disabling the chrominance channel during reception of monochrome signal transmissions, and an automatic chroma control (ACC) signal for controlling the gain of the chrominance channel during reception of color signal transmissions.

Color television broadcasting in accordance with standards established in the United States involves the transmission of a burst of color subcarrier oscillations following each horizontal deflection synchronizing pulse. Color television receivers include a source of local color subcarrier reference oscillations. The reference oscillations are applied to color demodulators which extract the color information from the received video signal existing in time between deflection synchronizing pulses. It is essential that the local color subcarrier reference or demodulating oscillations be in synchronism and in predetermined phase with the received bursts. This may be accomplished by means of a phase detector which compares the bursts with an output of a local oscillator and develops an automatic phase and frequency control (APFC) voltage for application to a reactance tube coupled to the oscillator. It is also important to develop a color killer control (CKC) voltage for disabling the chrominance or chroma channel of the television receiver during reception of monochrome transmissions. It is further desirable to generate an automatic chroma control (ACC) voltage to automatically control the gain of the chrominance or chroma channel during color transmissions in accordance with the amplitude of the color subcarrier bursts.

Color television receivers commonly include a balanced phase detector including two diodes. Two out-of-phase outputs from the color subcarrier oscillator are applied across respective ones of the diodes. The received color subcarrier bursts are applied in one phase across the two diodes. An APFC voltage is derived from the balanced arrangement for application to a reactance tube which controls the frequency and phase of the local oscillator. A color killer control (CKC) voltage is derived in an unbalanced manner from the circuit elements associated with one of the diodes. The CKC voltage is proportional to the amplitude of the bursts. This arrangement is relatively noise immune so far as the APFC voltage is concerned, but is not noise immune so far as the CKC voltage is concerned.

It is known to employ two balanced phase detectors both receptive to the received bursts and an output of the local oscillator. An APFC voltage is obtained from one of the balanced phase detectors, and a CKC voltage is obtained from the other balanced phase detector. This arrangement requires at least four diodes and a sufficient number of circuit components to complete two separate balanced phase detectors.

It is a general object of this invention to provide an improved phase detector system requiring only two diodes and providing an APFC voltage which is substantially noise immune, and a CKC voltage which is completely noise immune.

It is another object to provide an improved phase detector system for use in a color television receiver to provide APFC, CKC, and ACC voltages.

It is a further object of this invention to provide a color television receiving system including an improved and simplified circuit for providing an APFC voltage, and providing a CKC voltage which varies as a function not only of the amplitude of the bursts but also as a function of the relative phases of the bursts and the local oscillations.

It is a still further object of this invention to provide a phase detector system, for use in a color television receiver, which provides an APFC voltage and which also provides a CKC voltage having a negative value when the bursts and oscillations are in synchronism, and having a zero value when bursts are absent or when the bursts and local oscillations are not in synchronism.

A combination automatic phase and frequency control and color killer control circuit constructed according to the teachings of this invention includes two diodes and load resistor means connected across the diodes. A source of received color subcarrier bursts and a source of local color subcarrier reference oscillations are applied to the two diodes. The output of one of the sources is applied in two opposite phases across respective ones of the two diodes. The output of the other source is applied in one phase across both of the diodes. The resistor means connected across the diodes has a balance point from which a color killer control (CKC) voltage is obtained, and an unbalance point from which an automatic phase and frequency control (APFC) voltage is obtained and fed back to control the phase and frequency of the reference oscillator. The APFC loop is set up so that when bursts are absent, the oscillator frequency is equal to the burst frequency, a zero voltage appears at the balance point and a predetermined voltage appears at the unbalance point. Then when bursts are present, the APFC loop maintains the voltage at the unbalance point at the predetermined value and a voltage of given polarity appears at the balance point for use as a CKC voltage. When bursts are absent and received noise is applied to the burst input of the detector, no CKC voltage appears at the balance point. The arrangement therefore provides a noise immune CKC voltage. The diodes may be connected in a matrix arrangement or an adder arrangement.

A larger CKC voltage can be obtained by adjusting the APFC loop so that when bursts are absent, the frequency of the oscillator is slightly off from the frequency of the bursts. Then when bursts are received, the frequency of the oscillator is pulled in to the frequency of the bursts and this action increases the CKC voltage developed at the balance point.

These and other objects and aspects of the invention are described in greater detail in conjunction with the appended drawings, wherein.

Figure 1:
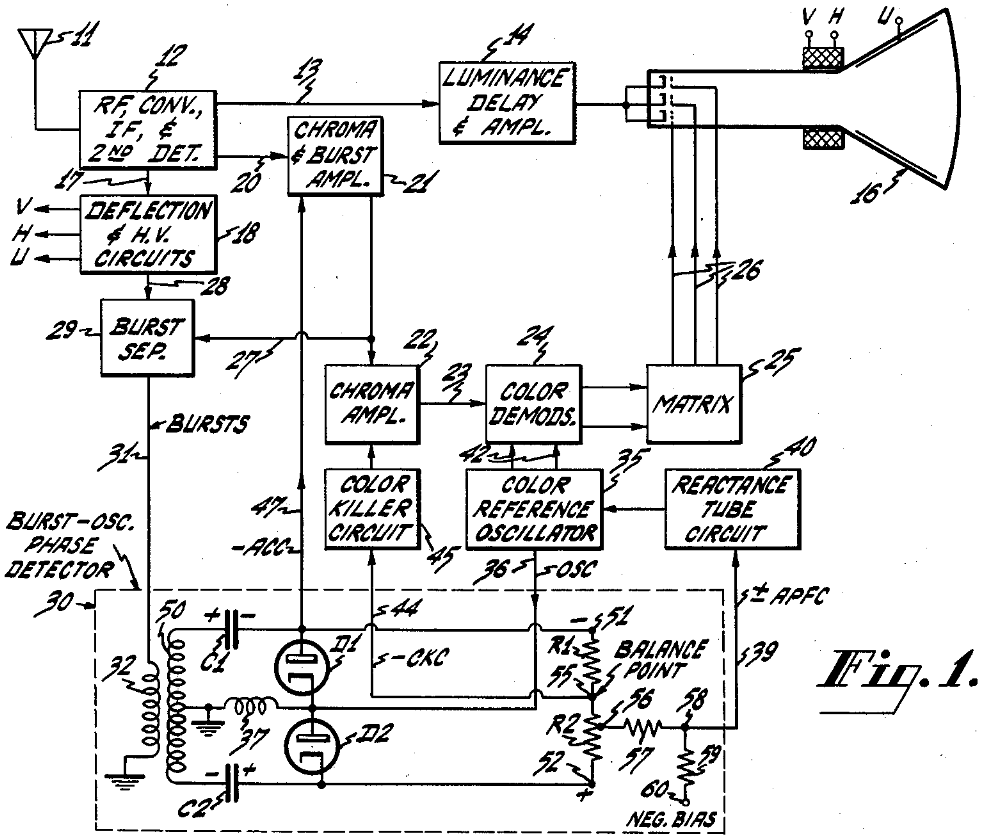
Figure 1 is a block diagram of a color television receiver wherein a matrix type of phase detector according to the invention is shown in circuit diagram form.

Reference will now be made to Figure 1 for a description of a color television receiver including a phase detector system according to this invention. A television signal received by antenna 11 is applied to a television signal receiver 12 including a radio frequency amplifier, a converter, an intermediate frequency amplifier and a second detector. One output (not shown) from the receiver 12 is applied to an audio detector and amplifier having an output connected to a loudspeaker for the purpose of reproducing the audio portion of the received television signal. An output 13 from the receiver 12 is applied through a luminance signal delay and amplifying means 14 to the cathodes of a color kinescope 16. An output 17 from the receiver 12 is applied to deflection and high voltage circuits 18 having a vertical deflection output V, a horizontal deflection output H, and an ultor voltage output U which are connected to correspondingly designated terminals of the color kinescope 16. Another output 20 from the receiver 12 is applied through a chroma and burst amplifier 21 to a chroma amplifier 22. A chroma output on lead 23 is applied to color demodulators 24. Demodulated outputs from the demodulators 24 are applied to a matrix 25 from which three color difference signal outputs 26 are coupled to respective ones of the three control grids in the kinescope 16.

The output on lead 27 from the chroma and burst amplifier 22, and a flyback pulse output on lead 28 from the circuits 18, are applied to a burst separator 29. The burst output from the burst separator 29 is applied to a phase detector system 30 by means of a lead 31 and an inductor 32. A color subcarrier reference oscillator 35 has an output on lead 36 which is applied to another input of the detector system 30 by means of an inductor 37. An automatic phase and frequency control (APFC) signal output from the detector system 30 is applied over lead 39 to a reactance tube circuit 40. The APFC signal acts through the reactance tube circuit 40 to maintain the color subcarrier oscillator 35 in synchronism and in predetermined phase with the received bursts. The oscillator 35 and reactance tube circuit 40 constitute a source of local reference oscillations having a frequency control input on lead 39. Two outputs 42 from the oscillator 35, having phases corresponding with the desired phases of demodulation, are coupled to the color demodulators 24.

A color killer output, designated CK, from the phase detector system 30 is applied over lead 44 to a color killer circuit 45 having an output applied to the chroma amplifier 22. The color killer circuit 45 may be as shown in Fig. 14 or 15 on p. 308 of the March 1956 issue of the Proceedings of the IRE. The color killer circuit deactivates the chroma amplifier 22 during receipt of monochrome transmissions. An automatic chroma control output, designated ACC, is applied over lead 47 to the chroma and burst amplifier 21 to automatically control the gain of the amplifier during receipt of color signal transmissions.

The matrix type phase detector system 30 in Figure 1 includes two diodes D1 and D2. Resistor means R1, R2 is connected across the diodes. Considering the polarities of the diodes, the bursts from inductor 32 are coupled through secondary inductor 50 and through capacitors C1 and C2 in the same phase to the diodes D1 and D2. Again considering the polarities of the diodes, the reference oscillations in inductor 37 are coupled in opposite phases to the diodes D1 and D2. The diodes D1 and D2 conduct at times and for durations depending on the phases of the signals applied thereto. When the diodes conduct, current flows through resistor means R1, R2 and develops voltages of negative and positive polarities at the terminals 51 and 52, respectively, of the resistor means. The balance point 55 between equal resistors R1 and R2 is connected to the CKC output lead 44. The unbalance point 56 on resistor R2 is employed to provide a positive APFC voltage. The terminals 51 and 52 may be thought of as 100 percent removed in opposite directions from the balance point 55. The unbalance point 56 should be not more than twenty percent removed from the balance point, and is preferably ten percent, or less, removed from the balance point. The greater the removal of the unbalance point 56 from the balance point 55, the poorer is the noise immunity at the unbalance point. The unbalance point 56 is connected by an isolating resistor 57 to an APFC voltage output terminal 58. The terminal 58 is connected by a resistor 59 to the negative terminal 60 of a source of bias potential. If a zero APFC voltage is desired at output terminal 58 and lead 39 when the oscillator is locked in predetermined phase with the bursts, the value of negative bias potential at terminal 60 and the values of resistors 57 and 59 are selected to cancel the positive voltage at the unbalance point 56 when the oscillator is locked in phase with the bursts.

Figure 3A:
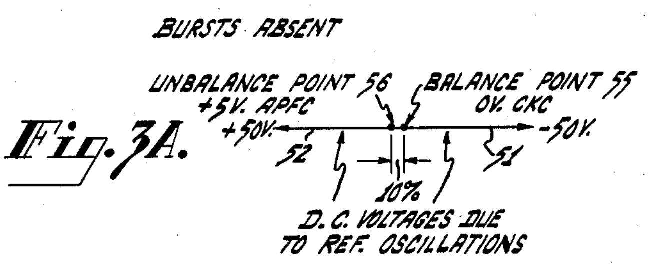
Figures 3A, 3B and 3C show charts which will be referred to in describing the operation of the invention.

In operation, the APFC loop including the oscillator 35, the phase detector 30 and the reactance tube circuit 40 are adjusted in the absence of bursts so that the frequency of the reference oscillator is equal to the standard frequency of the bursts, with zero voltage appearing at the balance point 55. Under this condition, the diodes conduct equally and equal and opposite D.C. voltages are developed at points 51 and 52 as represented in the diagram of Figure 3A. Zero voltage exists at the balance point 55 and a predetermined positive voltage exists at the unbalance point 56. Then, when bursts are applied to the phase detector, the reactance tube circuit will always maintain the phase of the oscillator such that this predetermined voltage exists at the unbalance point 56.

Figure 3B:
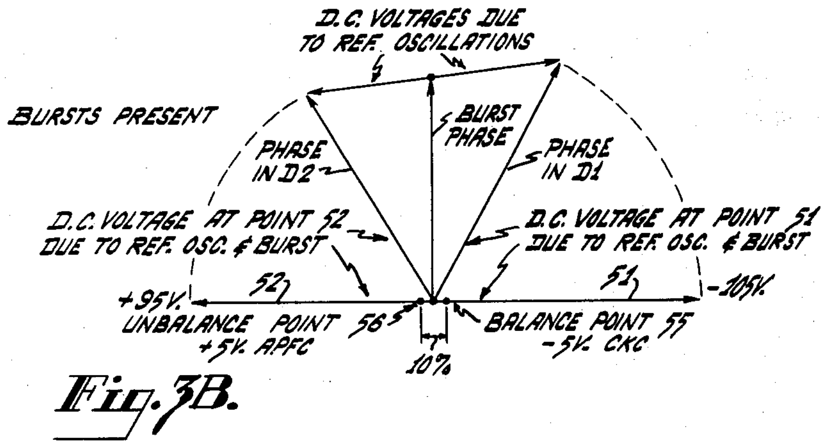

When bursts are first applied over lead 31 to the phase detector, the frequencies of the reference oscillations and the bursts are different so that they have a random and continuously varying phase relationship. Under this condition there is no change in the zero direct current voltage at the balance point 55 and no change in the positive direct current voltage at point 56. However, there is an alternating current change at unbalance point 56 which tends to bring the frequency of the oscillator in synchronism with the bursts. When synchronism is established, the APFC loop acts to maintain the phase of the oscillations at such a value with respect to the phase of the bursts so that the same predetermined positive voltage exists at the unbalance point 56. Under this condition, which is illustrated in the chart of Figure 3B, the phase relation will be off from a quadrature relation in a direction which increases the negative potential at terminal point 51 more than it increases the positive potential at point 52. The potential at the balance point 55, being half way between the potentials at the terminals 51 and 52, becomes a negative voltage. Voltage values are given on the charts of Figures 3A and 3B by way of example to illustrate the principles of operation.

The CKC voltage at the balance point 55 is zero when no bursts are received and when received bursts are not strong enough to maintain the reference oscillations in synchronism. The zero CKC voltage at balance point 55 acts through the color killer circuit 45 to deactivate the chroma amplifier during trace time. When the reference oscillator is locked in predetermined phase with the received bursts, the negative CKC voltage at the balance point acts through the color killer circuit 45 to permit the chroma signal to be amplified in the chroma amplifier 22.

Figure 3C:
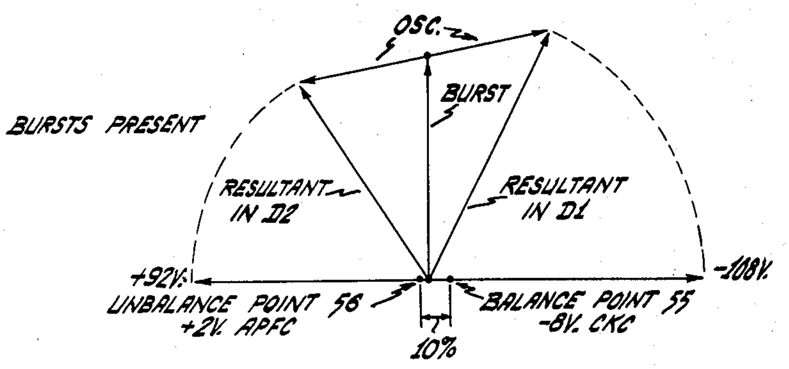

An increased CKC voltage can be developed at the balance point 55 by initially adjusting the APFC loop so that when bursts are absent, the frequency of the oscillator 35 is slightly off from the frequency of the bursts. Then when bursts are received, the APFC loop acts to make the oscillator frequency equal to the bursts. In doing so, the D.C. voltages at both the unbalance point 56 and the balance point 55 are shifted in a direction to increase the CKC voltage (as illustrated in Figure 3C) over what it would be with the previously described adjustment of the APFC loop (as illustrated in Figure 3B). Figure 3C shows a CKC voltage of −8 volts by comparison with Figure 3B which shows a CKC voltage of −5 volts. This illustrates the increased CKC voltage obtainable by off-tuning the APFC loop a small amount to a frequency well within the pull-in range of the loop. The CKC voltage taken from the balance point 55 remains substantially noise immune.

The voltage at the terminal 51 is employed as an automatic chroma control (ACC) voltage which is applied over lead 47 to the burst and chroma amplifier 21 to serve as an automatic gain control voltage which varies in accordance with the amplitude of the received bursts.

Figure 2:
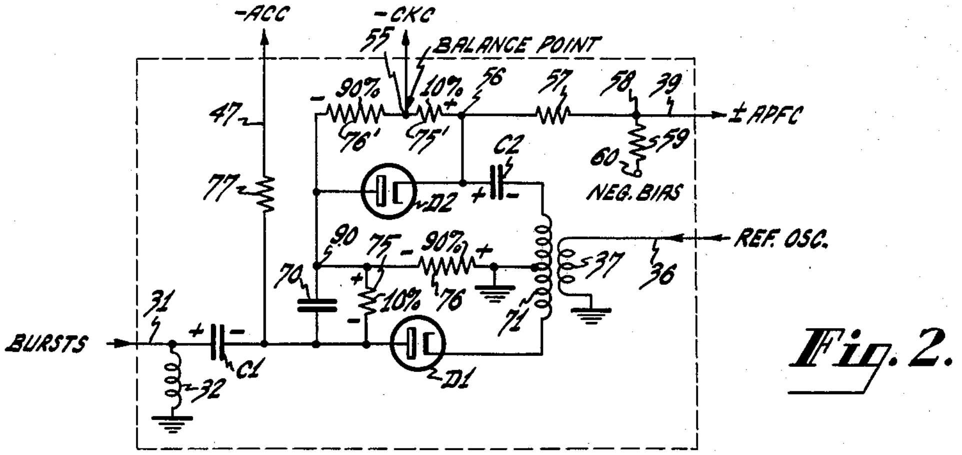
Figure 2 is a circuit diagram of a phase detector of the adder type arranged according to the invention.

Figure 2 shows an adder type phase detector which may be substituted for the matrix type phase detector included in the receiver of Figure 1. The same reference numerals are applied to corresponding elements. Bursts are applied from inductor 32 through capacitor C1 to diode D1 and through capacitor 70 to diode D2. The bursts are applied in the same phase to both diodes. The reference oscillations are applied from primary coil 37 through a phase splitter 71 in one phase to diode D1 and in an opposite phase through capacitor C2 to diode D2. Resistors 75 and 76 are the load resistors for diode D1 and resistors 75′ and 76′ are the load resistors for diode D2. Resistors 75 and 75′ preferably have equal values and resistors 76 and 76′ preferably have equal values. The APFC loop is initially set up so that when no bursts are applied to the phase detector the oscillator is at burst frequency with zero voltage developed at balance point 55. The unbalance point 56 is not more than twenty percent, and preferably ten percent or less, removed from the balance point 55. The percentage removal of the unbalance point 56 is determined by the ratio of resistors 75′ and 76′, and the corresponding ratio of resistors 75 and 76.

When only reference oscillations are applied to diodes D1 and D2, the individual diodes conduct on alternate half cycles. When diode D1 conducts, a voltage equal to 100 percent of the peak voltage of the oscillation is developed across the series combination of resistors 75 and 76. On alternate half cycles, when diode D2 conducts, a voltage equal to 100 percent of the peak voltage appears across the series combination of resistors 75′ and 76′. If resistor 76 has a value equal to 90 percent of the value of resistor 75 plus resistor 76, the D.C. voltage across resistor 76 is equal to 90 percent of the oscillation peak voltage. The resistors 76′ and 75′ are also in the same ratio so the voltage across resistor 76′ is equal to 90 percent of the oscillation peak voltage. Because of the polarities, the voltage across resistor 76 cancels the voltage across resistor 76′ so that a zero voltage exists at the balance point 55 and a 10 percent positive voltage exists at the unbalance point 56.

When bursts are then applied to the input lead 31, the diodes D1 and D2 detect the peak voltages due to the vector addition of the reference oscillations and the bursts as illustrated in Figure 3B. The resulting D.C. voltages across the two pairs of resistors increase. The APFC loop changes the phase of the oscillations so that the same predetermined voltage exists at the unbalance point 56. The voltage at the balance point 55 must be removed in the negative direction from the potential at point 55 by 10 percent of the larger voltage now appearing across the series resistors 75′ and 76′. Therefore, the voltage at the balance point 55 is negative voltage when bursts are present with sufficient amplitude to synchronize the reference oscillator. The voltage at the balance point 55 is thus useful for color killer purposes as described in connection with the arrangement of Figure 1.

As has been described in connection with the phase detector in Figure 1, the phase detector of Figure 2 may be employed in a system wherein the APFC loop is initially adjusted in the absence of bursts to provide an oscillator frequency differing from the burst frequency. This form of operation of Figure 2 is also illustrated by the charts of Figures 3A and 3C. Actually, the matrix phase detector in Figure 1 provides half as much D.C. output, for a given phase shift, from the points 55 and 56 as the adder phase detector of Figure 2.

In the adder circuit of Figure 2, an ACC voltage is obtained from the plate of diode D1 through an isolating resistor 77 and an output lead 47. The ACC voltage is thus obtained in an unbalanced manner and is proportional to the voltage across resistors 75 and 76, which is in turn substantially proportional to the amplitude of the bursts.

In the arrangements of both Figure 1 and Figure 2, the CKC voltage can be taken from the resistor means at a point not more than twenty percent removed from the balance point 55 in the opposite direction from that of the APFC take-off point 56. The CKC voltage can be oppositely biased in the same manner as shown for the APFC voltage. This arrangement has the disadvantage of making the CKC voltage somewhat noise sensitive. It is therefore preferable to take the CKC voltage from the balance point 55.

What is claimed is:

1. In a color television receiver including an automatic phase and frequency control and color killer control circuit, the combination of, a chrominance and burst amplifier, burst separator means coupled to said amplifier, a local color subcarrier reference oscillator having a frequency control input terminal, two diodes, means to apply the output of said oscillator in opposite phases to said diodes, means to apply the bursts from said burst separator in the same phase to said diodes, a load resistor means connected across said diodes, said resistor means having a balance point at which the detected voltages due to opposite-phase oscillations from said oscillator balance each other, said resistor means also having an unbalance point, means coupling said unbalance point to said frequency control input terminal to provide an automatic phase and frequency control loop, and means coupled from said balance point to said amplifier to disable the amplifier when bursts are absent.

2. In a color television receiver including an automatic phase and frequency control and color killer control circuit, the combination of, a chrominance and burst amplifier, burst separator means coupled to said amplifier, a local color subcarrier reference oscillator having a frequency control input terminal, two diodes, means to apply the output of said oscillator in opposite phases to said diodes, means to apply the bursts from said burst separator in the same phase to said diodes, a load resistor means connected across said diodes, said resistor means having a balance point at which the detected voltages due to opposite-phase oscillations from said oscillator balance each other, said resistor means also having an unbalance point, means coupling said unbalance point to said frequency control input terminal to provide an automatic phase and frequency control loop, and means coupled from said balance point to said amplifier to disable the amplifier when bursts are absent, said frequency control loop being adjusted to maintain the frequency of said oscillator substantially equal to the frequency of said bursts in the absence of received bursts, whereby a voltage shift occurs at said balance point when bursts are received.

3. In a color television receiver including an automatic phase and frequency control and color killer control circuit, the combination of, a chrominance and burst amplifier, burst separator means coupled to said amplifier, a local color subcarrier reference oscillator having a frequency control input terminal, two diodes, means to apply the output of said oscillator in opposite phases to said diodes, means to apply the bursts from said burst separator in the same phase to said diodes, a load resistor means connected across said diodes, said resistor means having a balance point at which the detected voltages due to opposite-phase oscillations from said oscillator balance each other, said resistor means also having an unbalance point, means coupling said unbalance point to said frequency control input terminal to provide an automatic phase and frequency control loop, and means coupled from said balance point to said amplifier to disable the amplifier when bursts are absent, said frequency control loop being adjusted to maintain the frequency of said oscillator different from the frequency of said bursts in the absence of received bursts, whereby a voltage shift occurs at said balance point when bursts are received.

4. In a color television receiver including a combination automatic phase and frequency control and color killer control circuit, the combination of, a chrominance and burst amplifier, means coupled to the output of said amplifier and providing a source of received color subcarrier bursts of given frequency, a source of local color subcarrier reference oscillations having a frequency control input terminal, two diodes, means to apply the output of one of said sources in the same phase to both diodes, means to apply the output of the other of said sources in two opposite phases to the two diodes, a load resistor means connected across said diodes, said resistor means having a balance point at which the detected voltages due to said two opposite phases substantially balance each other and having an unbalance point, means coupling said unbalance point to said frequency control input terminal to provide an automatic phase and frequency control loop, and means coupled from said balance point to said chrominance amplifier to disable the amplifier when bursts are absent.

5. In a color television receiver including a combination automatic phase and frequency control and color killer control circuit, the combination of, a chrominance and burst amplifier, means coupled to the output of said amplifier and providing a source of received color subcarrier bursts of given frequency, a source of local color subcarrier reference oscillations having a frequency control input terminal, two diodes, means to apply the output of one of said sources in the same phase to both diodes, means to apply the output of the other of said sources in two opposite phases to the two diodes, a load resistor means connected across said diodes, said resistor means having a balance point at which the detected voltages due to said two opposite phases substantially balance each other and having an unbalance point, means coupling said unbalance point to said frequency control input terminal to provide an automatic phase and frequency control loop, said loop being adjusted when bursts are absent to provide a predetermined voltage at said unbalance point when the frequency of the oscillator is equal to said given frequency, whereby when bursts are present said predetermined voltage is maintained at said unbalance point and a voltage of predetermined polarity is generated at said balance point, and means coupled from said balance point to said chrominance amplifier to disable the amplifier when bursts are absent.

6. In a color television receiver including a combination automatic phase and frequency control and color killer control circuit, the combination of, a chrominance and burst amplifier, means coupled to the output of said amplifier and providing a source of received color subcarrier bursts of given frequency, a source of local color subcarrier reference oscillations having a frequency control input terminal, two diodes, means to apply the output of one of said sources in the same phase to both diodes, means to apply the output of the other of said sources in two opposite phases to the two diodes, a load resistor means connected across said diodes, said resistor means having a balance point at which the detected voltages due to said two opposite phases substantially balance each other and having an unbalance point, means coupling said unbalance point to said frequency control input terminal to provide an automatic phase and frequency control loop, said loop being adjusted when bursts are absent to make the reference oscillations of frequency different from said given frequency but within the pull-in range of said automatic phase and frequency control loop, whereby when bursts are present the frequency of the reference oscillations is made equal to said bursts and a voltage shift occurs at said balance point, and means coupled from said balance point to said chrominance amplifier to disable the amplifier when bursts are absent.

7. In a color television receiver including a combination automatic phase and frequency control and color killer control circuit, the combination of, a chrominance amplifier, a source of received color subcarrier bursts of given frequency, a source of local color subcarrier reference oscillations having a frequency control input terminal, two diodes, means to apply the output of one of said sources in the same phase to both diodes, means to apply the output of the other of said sources in two different phases to the two diodes, a load resistor means connected across said diodes, said resistor means having a first point and an unbalance point spaced apart, means coupling said unbalance point to said frequency control input terminal to provide an automatic phase and frequency control loop, said loop being adjusted when bursts are absent to provide a predetermined voltage at said unbalance point when the frequency of the oscillator is equal to said given frequency, whereby when bursts are present said predetermined voltage is maintained at said unbalance point and a voltage change occurs at said first point, and means coupled from said first point to said chrominance amplifier to disable the amplifier when bursts are absent.

8. In a color television receiver including a combination automatic phase and frequency control and color killer control circuit, the combination of, a chrominance amplifier, a source of received color subcarrier bursts of given frequency, a source of local color subcarrier reference oscillations having a frequency control input terminal, two diodes, means to apply the output of one of said sources in the same phase to both diodes, means to apply the output of the other of said sources in two different phases to the two diodes, a load resistor means connected across said diodes, said resistor means having a balance point and having first and second spaced taps, said taps being not more than twenty percent removed from said balance point, means coupling said second point to said frequency control input terminal to provide an automatic phase and frequency control loop, said loop being adjusted when bursts are absent to provide a second voltage at said second point and a first voltage at said first point when the frequency of the oscillator is equal to said given frequency, whereby when bursts are present said second voltage is maintained at said second point and a voltage change occurs at said first point, and means coupled from said first point to said chrominance amplifier to disable the amplifier when bursts are absent.

9. In a television receiver adapted to receive either composite color television signal including a chrominance signal component and a color synchronizing burst component or a monochrome television signal lacking said color synchronizing burst component, the combination including: signal receiving means to receive either said monochrome television signal or said composite color television signal; processing circuit means including image reproducing apparatus for reproducing an image, said signal processing circuit means being coupled to said receiving means and operable in response to a control voltage of a first magnitude to be conditioned to reproduce composite color television signals but operable in response to a second magnitude of control voltage to be conditioned to reproduce only monochrome television signals; means providing a source of color reference oscillations having a frequency control input terminal coupled with said signal processing circuit for demodulating said chrominance signal components; means providing a phase detector comprising first and second rectifiers and including a load resistor network connected between said rectifiers; means for applying signals from said source of color subcarrier oscillations and said color synchronizing bursts to said first and second rectifiers, one of said signals being applied in two different phases to said rectifiers; said load resistor network having a balance point at which equal detected voltages due to rectification of the signals applied to said rectifiers balance each other; means coupling said frequency control input terminal to said load resistor network at an unbalance point not more than 20 percent removed from said balance point to provide an automatic phase and frequency control loop; said loop being adjusted when bursts are absent to provide a predetermined voltage at said unbalance point, whereby when color synchronizing bursts are present said loop tends to maintain said predetermined voltage at said unbalance point; means for deriving a control voltage from a point on said load resistor network in the vicinity of said balance point but removed from said unbalance point which provides a voltage of said first magnitude when said color synchronizing burst is present, and of said second magnitude when said color synchronizing burst is absent; and means for applying said control voltage to said signal processing circuits.

10. In a television receiver adapted to receive either composite color television signal including a chrominance signal component and a color synchronizing burst component or a monochrome television signal lacking said color synchronizing burst component, the combination including: signal receiving means to receive either said monochrome television signal or said composite color television signal; signal processing circuit means including image reproducing apparatus for reproducing an image, said signal processing circuit means being coupled to said receiving means and operable in response to a control voltage of a first magnitude to be conditioned to reproduce composite color television signals but operable in response to a second magnitude of control voltage to be conditioned to reproduce only monochrome television signals; means providing a source of color reference oscillations having a frequency control input terminal coupled with said signal processing circuits for demodulating said chrominance signal components; means providing a phase detector comprising first and second rectifiers only and including an output impedance means having first and second output terminals connected with said rectifiers; means for applying signals from said source of color subcarrier oscillations and said color synchronizing bursts to said first and second rectifiers; means coupling said first output terminal to said frequency control input terminal to provide an automatic phase and frequency control loop, said loop being adjusted when said color synchronizing bursts are present and said color reference oscillations are synchronous with said color synchronizing bursts to provide a control voltage of said first magnitude at said second output terminal, and to produce a control voltage of said second magnitude at said second output terminal when said color reference oscillations are nonsynchronous with said color synchronizing bursts and when said color synchronizing bursts are absent; and means for applying said control voltage at said second terminal to said signal processing circuits.

References Cited in the file of this patent

UNITED STATES PATENTS 2,813,147 Richman -------------- Nov. 12, 1957

OTHER REFERENCES

"The D.C. Quadricorrelator: A Two-Mode Synchronization System," Proceedings of I.R.E., January 1954, pages 288–299.

RCA, Color Television Receiver, Model CT-100, March 1954, pages 31 to 34, copy in Division 41.